(12) United States Patent
Banning et al.

(10) Patent No.: US 6,174,937 B1
(45) Date of Patent: Jan. 16, 2001

(54) COMPOSITION OF MATTER, A PHASE CHANGE INK, AND A METHOD OF REDUCING A COEFFICIENT OF FRICTION OF A PHASE CHANGE INK FORMULATION

(75) Inventors: Jeffery H. Banning, Hillsboro; C. Wayne Jaeger, Beaverton; Donald R. Titterington, Tualatin, all of OR (US)

(73) Assignee: Xerox Corporation, Rochester, NY (US)

( * ) Notice: Under 35 U.S.C. 154(b), the term of this patent shall be extended for 0 days.

(21) Appl. No.: 09/354,237

(22) Filed: Jul. 16, 1999

(51) Int. Cl.$^7$ .............................. C08L 77/00; C08L 77/06; C08G 69/26; C09D 11/10
(52) U.S. Cl. ......................... 523/160; 524/602; 524/607; 528/367
(58) Field of Search ..................... 523/160, 161; 106/31.29, 31.61; 524/601, 602, 606, 607; 528/332, 363, 367, 422

(56) References Cited

U.S. PATENT DOCUMENTS

| | | | |
|---|---|---|---|
| 4,066,585 | * 1/1978 | Schepp et al. | 524/279 |
| 4,830,671 | 5/1989 | Frihart et al. | 106/27 |
| 4,889,560 | 12/1989 | Jaeger et al. | 106/27 |
| 5,138,027 | * 8/1992 | Van Beek | 528/339.3 |
| 5,194,638 | 3/1993 | Frihart et al. | 554/47 |
| 5,372,852 | 12/1994 | Titterington et al. | 427/288 |
| 5,645,632 | * 7/1997 | Pavlin | 106/31.29 |
| 5,700,313 | * 12/1997 | Larson, Jr. | 523/161 |
| 5,902,841 | * 5/1999 | Jaeger et al. | 523/161 |
| 5,998,570 | * 12/1999 | Pavlin et al. | 528/310 |
| 6,028,138 | * 2/2000 | Hahn et al. | 524/590 |

FOREIGN PATENT DOCUMENTS

WO 96/10051 * 4/1996 (WO).

* cited by examiner

*Primary Examiner*—Vasu Jagannathan
*Assistant Examiner*—Callie E. Shosho
(74) *Attorney, Agent, or Firm*—Wells, St. John, Roberts, Gregory & Matkin P.S.

(57) ABSTRACT

The invention encompasses a phase change ink comprising a material of the formula

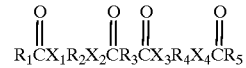

wherein $X_1$, $X_2$, $X_3$ and $X_4$ are segments comprising atoms selected from groups V and VI of the periodic table; wherein at least one $R_1$ and $R_5$ comprises at least 37 carbon units; and wherein $R_2$, $R_3$ and $R_4$ each comprise at least one carbon unit. The invention further encompasses a composition of matter, as well as methods of reducing coefficients of friction of phase change ink formulations.

39 Claims, 3 Drawing Sheets

$2 \, CH_3(CH_2)_n CO_2^-$ + $2(NH_2)R_1(NH_2)$ + $^-O_2C \, R_2CO_2^-$
MONOACID          DIAMINE            DIMER ACID $$CH_3(CH_2)_n \overset{O}{\underset{\|}{C}}(NH)R_1(NH)\overset{O}{\underset{\|}{C}} \, R_2 \overset{O}{\underset{\|}{C}}(NH)R_1(NH)\overset{O}{\underset{\|}{C}}(CH_2)_n CH_3$$

FIG. 1

COMPOSITION OF MATTER, A PHASE CHANGE INK, AND A METHOD OF REDUCING A COEFFICIENT OF FRICTION OF A PHASE CHANGE INK FORMULATION

BACKGROUND OF THE INVENTION

1. Field of the Invention

The invention pertains to compositions of matter, phase change inks and methods of reducing coefficients of friction associated with the surfaces of printed phase change inks.

2. Description of the Relevant Art

In general, phase change inks are in a solid phase at ambient temperature, but exist in a liquid phase at an elevated operating temperature of an ink jet printing device. At the jet operating temperature, droplets of liquid ink are ejected from the printing device and, when the ink droplets contact the surface of a printing media, they solidify to form a printed pattern. Phase change ink methodology is described generally in U.S. Pat. Nos. 4,889,560; 5,372,852 and 5,827,918, all of which are assigned to the assignee of the present invention and incorporated herein by reference.

Phase change inks typically comprise a tetra-amide, a tackifier, and a viscosity modifying agent as primary components. An exemplary viscosity modifying agent is stearylstearamide, which can be provided to a concentration of less than or equal to about 50% (by weight) in a phase change ink.

Exemplary tackifiers are: KE-311 Resin, a glycerol ester of hydrogenated abietic (rosin) acid made by Arakawa Chemical Industries Ltd.; and KE-100 Resin, an ester of tetrahydroabietic acid and glycerol, which is also available from Arakawa Chemical Industries Ltd. Tackifiers are typically provided to a concentration of less than or equal to about 25% (by weight) in a phase change ink.

Exemplary tetra-amide compounds can be formed by reacting ethylene diamine with a dimer acid and an appropriate fatty acid. Various tetra-amide compounds are described in U.S. Pat. Nos. 4,830,671 and 5,194,638. Such exemplary compounds comprise the general formula

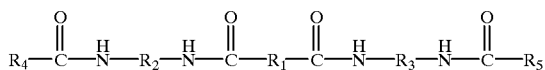

wherein $R_1$ comprises a polymerized fatty acid residue, $R_2$ and $R_3$ represent groups with up to 12 carbon atoms, and $R_4$ and $R_5$ represent groups with up to 36 carbon atoms. The tetra-amide compounds of phase change inks are typically provided in the inks to from about 15% to about 35% (by weight) to increase glass transition temperature ($T_g$) and adhesion. Tetra-amide compounds can further provide hardness, dye solubility, thermal stability and toughness to a phase change ink.

In addition to the above-described primary components, phase change inks can comprise a number of secondary components such as, for example, dyes, plasticizers, and antioxidants, as described in, for example, U.S. Pat. Nos. 4,889,560 and 5,372,852.

A printed phase change ink can have a waxy surface texture. A difficulty in utilizing phase change inks can be that the waxy textured surface will have a relatively high coefficient of friction when slid over a glass surface. Such can cause inconveniences when photocopying or scanning an image formed with phase change inks. For instance, when a printed image is placed on a glass surface of a photocopier, the waxy surface of the printed phase change ink can stick to the glass surface of the copier and cause smudges, and possibly even jam the copier. It is therefore desirable to develop new phase change ink compositions having lower coefficients of friction than presently available compositions.

A method which has been utilized with some success to reduce the coefficient of friction of printed ink surfaces is to incorporate polyethylene wax into phase change inks. Unfortunately, it is found that polyethylene waxes are of limited solubility in present phase change ink formulations. It would be desirable to develop new ink formulations having improved solubility of polyethylene waxes.

BRIEF SUMMARY OF THE INVENTION

In one aspect, the invention encompasses a phase change ink comprising a material of the formula

wherein $X_1$, $X_2$, $X_3$, and $X_4$ are segments comprising atoms selected from groups V and VI of the periodic table; wherein at least one of $R_1$ and $R_5$ comprises at least 37 carbon units; and wherein $R_2$, $R_3$ and $R_4$ each comprise at least one carbon unit.

In other aspects, the invention further encompasses compositions of matter, as well as methods of reducing coefficients of friction of phase change ink formulations.

BRIEF DESCRIPTION OF THE DRAWINGS

Preferred embodiments of the invention are described below with reference to the following accompanying drawings.

FIG. 1 is a diagram of an exemplary reaction process encompassed by the present invention.

DESCRIPTION OF THE PREFERRED EMBODIMENTS

Figure 2:
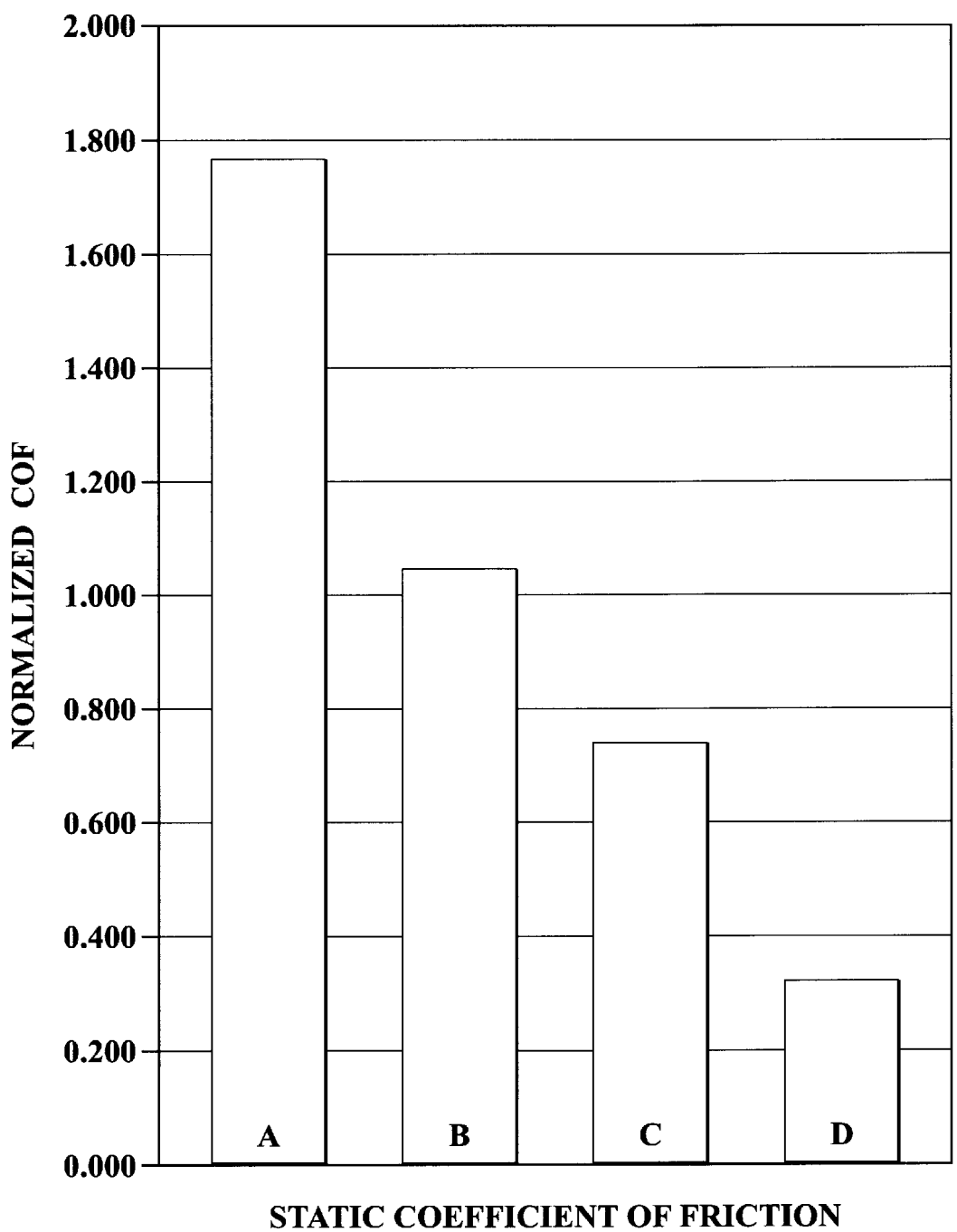
FIG. 2 is a bar graph illustrating coefficients of friction for phase change inks of the present invention relative to a phase change ink of the prior art, with the coefficients of friction measured utilizing static coefficient of friction testing methodology.

In one aspect, the invention encompasses a recognition that a coefficient of friction associated with a surface of a printed phase change ink can be decreased by increasing a length of at least one of the carbon tails associated with a tetra-amide. The prior art tetra-amide described in the "Background" section of this disclosure has carbon-containing tails $R_4$ and $R_5$, and is described to have each tail comprising up to 36 carbon atoms. In methodology of the present invention, the length of such carbon tails is increased to 37 or more carbon atoms, preferably to greater than or equal to 40 carbon atoms, and more preferably to greater than or equal to 50 carbon atoms. Also preferably, the number of carbon atoms in each tail does not exceed about 100, as such long carbon chains could increase a melting point of a phase change ink beyond a desired limit of about 100° C. A physical property that, like melting point, can have particular importance for the operational performance of a phase change ink is $T_g$. A phase change ink of the present invention preferably has a $T_g$ of from about −5° C. to about 40° C.

An exemplary compound encompassed by the present invention

wherein n is an integer greater than or equal to 36 and less than or equal to 99; and wherein $R_1$, $R_2$ and $R_3$ each comprise at least one carbon unit. In particular embodiments, $R_1$, $R_2$ and $R_3$ consist essentially of carbon and hydrogen, and in such embodiments, $R_1$, $R_2$ and $R_3$ can be, for example, alkyl groups. The exemplary compound can be formed by the methodology described in EXAMPLE 1 below.

It is noted that the chemistry described in the EXAMPLE 1 comprises combining a dimer acid (EMPOL™) with a long carbon chain monoacid (UNICID™) and ethylene diamine. The ethylene diamine effectively functions as a linker for connecting the long carbon chain to the dimer acid. In other words, each of the two amine groups of ethylene diamine functions as a nucleophile, with one of the amine groups hooking to an acid of the dimer acid and the other of the amine groups hooking to the acid of the monoacid, to link the monoacid to the dimer acid. Such is illustrated by the reaction formula of FIG. 1 wherein $R_1$ is —$CH_2CH_2$—, and $R_2$ comprises carbon and hydrogen. The acids and amines shown in FIG. 1 are illustrated in particular protonation states which are chosen for illustration purposes only. Such protonation states are not intended to be representative of a pH at which the reaction is run.

The invention encompasses compositions and processes besides those illustrated and described above and in the examples below. For instance, the invention encompasses chemistries wherein the diamine is replaced with other linker compounds. As an example, a diol could be utilized in place of the diamine linker to form a material of the structure shown below,

wherein $R_1$, $R_2$ and $R_3$ comprise at least one carbon unit, and wherein n is an integer greater than or equal to 36. In particular embodiments, $R_1$, $R_2$, and $R_3$ can consist essentially of carbon and hydrogen. In further embodiments $R_1$, $R_2$ and $R_3$ can consist of alkyl groups.

In alternative embodiments of the invention, a dithio compound (such as a dithiol) could be utilized as a linking compound in place of the diamine to form a structure having the formula shown below, wherein n, $R_1$, $R_2$ and $R_3$ are the same as described above with reference to the material formed from the diol.

In yet other alternative embodiments, a linking compound comprising a mixture of nucleophiles could be utilized. For instance, a linking compound could be utilized which has an oxygen atom as a nucleophile on one end, and a nitrogen atom as a nucleophile on another end.

The various linking compounds described above can be utilized to form a compound of the present invention having the general formula

wherein $X_1$, $X_2$, $X_3$, and $X_4$ are segments comprising atoms selected from group V of the periodic table (i.e., the group comprising nitrogen) and group VI of the periodic table (i.e., the group comprising oxygen and sulfur); wherein at least one of $R_1$ and $R_5$ comprises at least 37 carbon units; and wherein $R_2$, $R_3$ and $R_4$ each comprise at least one carbon unit. Segments $X_1$, $X_2$, $X_3$, and $X_4$ can be the same, or different than one another. In particular embodiments, $R_1$, $R_2$, $R_3$, $R_4$ and $R_5$ each consists essentially of carbon and hydrogen. The groups $R_1$, $R_2$, $R_3$, $R_4$ and $R_5$ can, for example, each consist of an alkyl group. In further particular embodiments, $R_1$ and $R_5$ can be the same as one another, and $R_2$ and $R_4$ can be the same as one another.

The compounds of the present invention can be substituted for some or all of the prior art tetra-amide in prior art phase change inks. Specifically, the compounds can be combined with tackifiers, viscosity modifying agents, and a number of secondary components, such as dyes, plasticizers, and antioxidants to form phase change inks encompassed by the present invention. Such inks can comprise the tackifiers, viscosity modifying agents and secondary components provided to about the concentrations utilized in prior art phase change inks.

The compounds of the present invention may be used in combination with conventional phase change ink colorant materials such as Color Index (C.I.) Solvent Dyes, Disperse Dyes, modified Acid and Direct Dyes, Basic Dyes, Sulphur Dyes, Vat Dyes, polymeric dyes such as those disclosed in U.S. Pat. No. 5,621,022, assigned to the assignee of the present application, and/or pigments. The compounds of the present invention may also be used in combination with isocyanate-derived colored resins, such as those disclosed in U.S. Pat. No. 5,780,528, assigned to the assignee of the present application. U.S. Pat. Nos. 5,621,022 and 5,780,528 are incorporated herein by reference.

In addition to the components discussed above, a phase change ink of the present invention will preferably also comprise polyethylene wax provided to a concentration of from greater than 0% to about 90% (by weight), and more preferably to from about 5% to about 50% (by weight). Suitable polyethylene waxes include POLYWAX 850™ and POLYWAX 655™, both of which are available from Baker-Petrolite of Tulsa, Oklahoma. The incorporation of a polyethylene wax into a phase change ink formulation of the present invention can reduce a coefficient of friction of an ink comprising the formulation. A prior art problem discussed in the "Background" of this disclosure is that the solubility of polyethylene waxes in prior art phase change inks can be poor. Among the advantages of phase change inks of the present invention relative to prior art phase change inks is that the solubility of polyethylene waxes in inks of the present invention can be better than the solubility in prior art inks.

Further advantages of phase change inks of the present invention relative to prior art phase change inks are described with reference to FIGS. 2 and 3, which compare coefficients of friction of inks of the present invention to prior art inks. The coefficients of friction were determined from the horizontal motion of a printed ink against a glass plate. Specifically, a printed ink was mounted to S the bottom of a sled (the sled having dimensions of about 2.5" by about 2.5", and having a weight of about 200 grams), and then provided against a glass plate. The sled was moved relative to the glass plate, and the force required to move the sled was measured to determine the coefficient of friction of the printed ink. A static coefficient of friction was measured from the initial force required to move the sled, and a kinetic coefficient of friction was measured from the force required to move the sled at a constant velocity of 2" per minute.

FIG. 2 illustrates the static coefficient of friction test results. Bar "A" corresponds to data obtained from a prior art phase change ink, and bars "B", "C" and "D" correspond to data obtained from phase change inks formed utilizing methodology of the present invention. Bar "B" corresponds to data obtained from an ink formed according to the method of EXAMPLE 2 below. EXAMPLE 2 incorporates a material formed according to the method of EXAMPLE 1. Bar "C" corresponds to data obtained from an ink formed according to the method of EXAMPLE 3 below. EXAMPLE 3 incorporates a material formed according to the method of EXAMPLE 1, and further comprises about 5% of a polyethylene wax. Bar "D" corresponds to data obtained from an ink formed according to the method of EXAMPLE 4 below. EXAMPLE 4 incorporates a material formed according to the method of EXAMPLE 1, and further comprises about 75% of a polyethylene wax.

Figure 3:
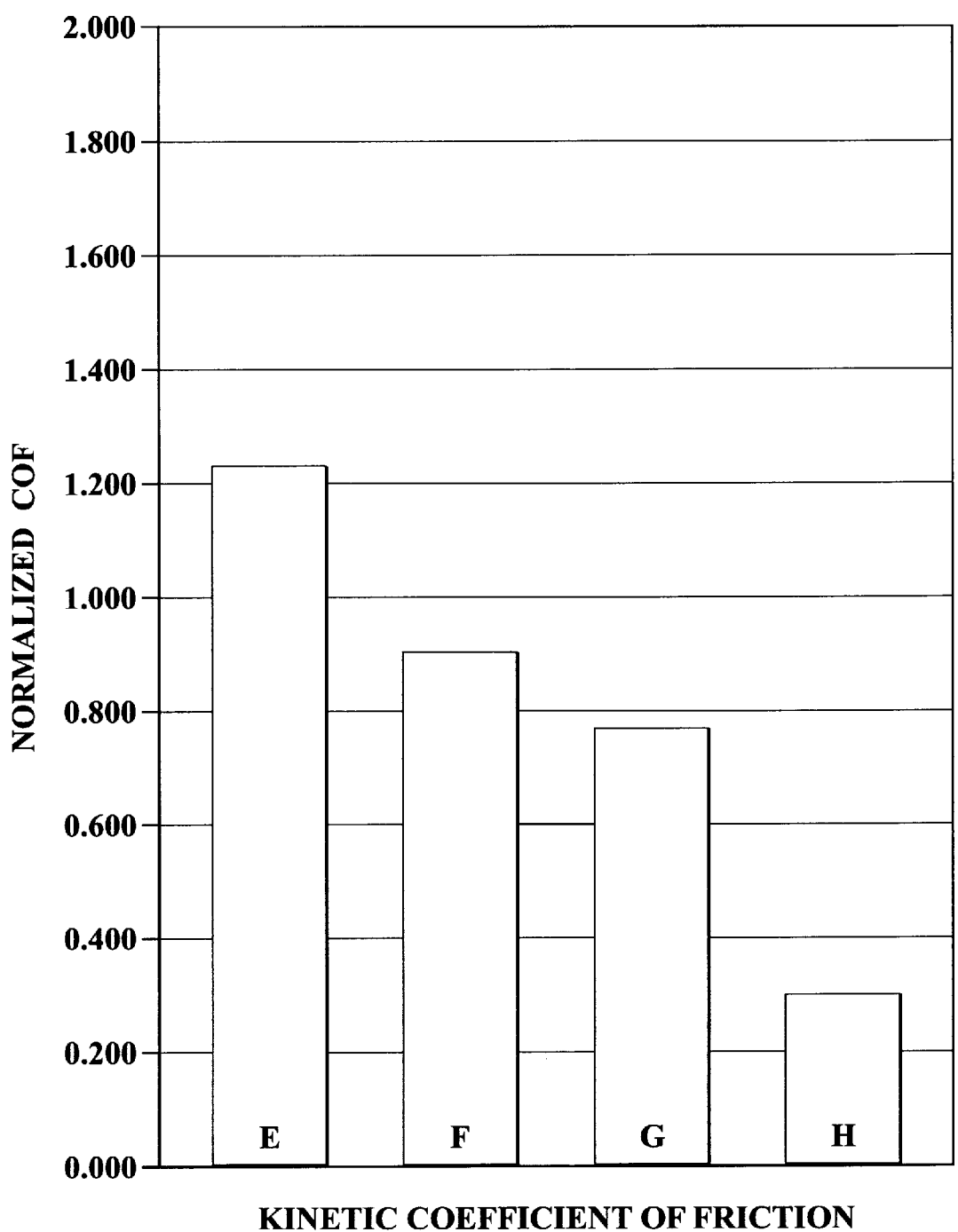
FIG. 3 is a bar graph illustrating coefficients of friction for phase change inks of the present invention relative to a phase change ink of the prior art, with the coefficients of friction measured utilizing kinetic coefficient of friction testing methodology.

FIG. 3 illustrates the kinetic coefficient of friction test results. Bar "E" corresponds to data obtained from a prior art ink, while bars "F", "G" and "H" correspond to data obtained from phase change inks of the present invention. Bar "F" corresponds to data obtained from an ink formed according to the method of EXAMPLE 2. EXAMPLE 2 incorporates a material formed according to the method of EXAMPLE 1. Bar "G" corresponds to data obtained from an ink formed according to the method of EXAMPLE 3. EXAMPLE 3 incorporates a material formed according to the method of EXAMPLE 1, and further comprises about 5% of a polyethylene wax. Bar "H" corresponds to data obtained from an ink formed according to the method of EXAMPLE 4. EXAMPLE 4 incorporates a material formed according to the method of EXAMPLE 1, and further comprises about 75% of a polyethylene wax.

It is noted that the ink utilized to obtain the data of bar "A" is identical to that utilized to obtain the data of bar "E", the ink utilized to obtain the data of bar "B" is identical to that utilized to obtain the data of bar "F", the ink utilized to obtain the data of bar "C" is identical to that utilized to obtain the data of bar "G", and the ink utilized to obtain the data of bar "D" is identical to that utilized to obtain the data of bar "H". It is also noted that the data graphed in bars "A", "B", "C", "D", "E", "F", "G" and "H" of FIGS. 2 and 3 was all obtained under about the same experimental conditions.

EXAMPLE 1

Approximately 0.27 moles of dimer acid (EMPOL 1008™, available from Henkel of Cincinnati, Ohio) is combined with about 0.27 moles of a mixture of long chain carboxylic acids referred to as UNICID 700™ (available from Baker-Petrolite of Tulsa, Okla.), under $N_2$ and in a three-necked roundbottom flask with a Trubore stirrer. The UNICID™ comprises carboxylic acids having at least 38 carbon units, and includes carboxylic acids with 50 carbon units. The mixture of UNICID™ and EMPOL™ is heated to 120° C., with stirring, and about 0.245 moles of ethylene diamine is added to the heated mixture under a high rate of agitation. An exotherm to 134° C. is observed. The temperature is increased to 150° C. and held for about 1 hour (water vapor is observed coming off at this time). The nitrogen is replaced with a vacuum distillation assembly, and the temperature increased to about 200° C. and held for about 2 hours until all of the water has condensed/distilled off/out of the reaction mixture. The final product is a translucent solid resin at room temperature characterized a viscosity of about 48.9 cPs (as measured by a Ferranti-Shirley cone-plate viscometer at about 140° C.).

EXAMPLE 2

This example demonstrates a method of producing a phase change ink. Solid phase change ink sticks were produced as follows:

Ingredients: 0.7 grams of Naugard 445 Antioxidant (Uniroyal Chemical Co., Inc., Middlebury, Conn.), 162.8 grams of Kemamide S-180 (Witco Corporation, Greenich, Conn.), 82.7 grams of PINECRYSTAL KE-100 Resin (Arakawa Chemical USA, Inc., Chicago, Ill.), 29.1 grams of Santicizer 278 Plasticizer (Monsanto Corporation, St. Louis, Mo.), 71.6 grams of the tetra-amide resin made of dimer acid, ethylene diamine and UNICID 700 (Baker Petrolite Polymers Division, Tulsa, Okla.) from Example 1, 8.19 grams of Savinyl Black RLSN (C.I. Solvent Black 45) (Clariant Corporation, Charlotte, N.C.).

The first four ingredients were added to a 600 mL stainless steel beaker and held for two hours in a 135° C. oven. The molten mixture was removed from the oven and placed in a heating mantle where the mixture was maintained at 115° C. The mixture was stirred while the Unicid 700 TA of Example 1 was added, followed by the addition of the black dye. The molten mixture was stirred for four hours until homogeneous. The viscosity of the ink was measured at 140° C. at 13.01 cPs. Hyflo Super Cel (3.5 grams) (Fluka Chemie, Switzerland) was added to the ink to aid filtration. The ink was filtered through a heated Mott apparatus (available from Mott Metallurgical) using #3 Whatman filter paper and 15 psi of nitrogen pressure. The filtrate was poured into molds and sticks of black solid ink were formed on cooling.

EXAMPLE 3

This example demonstrates a method of producing a phase change ink. Solid phase change ink sticks were produced as follows:

Ingredients: 0.7 grams of Naugard 445 Antioxidant (Uniroyal Chemical Co., Inc., Middlebury, Conn.), 153.4 grams of Kemamide S-180 (Witco Corporation, Greenich, Conn.), 78.3 grams of PINECRYSTAL KE-100 Resin (Arakawa Chemical USA, Inc., Chicago, Ill.), 24.8 grams of Santicizer 278 Plasticizer (Monsanto Corporation, St. Louis, Mo.), 67.2 grams of the tetra-amide resin made of dimer acid, ethylene diamine and UNICID 700 (Baker Petrolite Polymers Division, Tulsa, Okla.) from Example 1, 17.5 grams of the Polywax PE-850 (Baker Petrolite Polymers Division, Tulsa, Okla.), 8.19 grams of Savinyl Black is RLSN (C.I. Solvent Black 45) (Clariant Corporation, Charlotte, N.C.).

The first four ingredients were added to a 600 mL stainless steel beaker and held for two hours in a 135° C. oven. The molten mixture was removed from the oven and placed in a heating mantle where the mixture was maintained at 115° C. The mixture was stirred while the Unicid 700 TA of Example 1 was added, followed by the addition of the Polywax PE-850 and the black dye. The molten mixture was stirred for three hours until homogeneous. The viscosity of the ink was measured at 140° C. at 12.77 cPs. Hyflo Super Cel (3.5 grams) (Fluka Chemie, Switzerland) was added to the ink to aid filtration. The ink was filtered through a heated Mott apparatus (available from Mott Metallurgical) using #3 Whatman filter paper and 15 psi of nitrogen pressure. The filtrate was poured into molds and sticks of black solid ink were formed on cooling.

EXAMPLE 4

Black Ink made from Polyethylene Wax and Compatible Amide Resin

In a stainless steel beaker were combined 200 grams of the material from Example 1 and 700 grams of Polywax PE655[1]. The materials were melted together at a temperature of about 135° C. in an oven, then blended by stirring in a temperature controlled mantle for ½ hr. at 135° C. At that time 27.84 grams of Solvent Black 45[2] dye was added to the mixture and the mixture was stirred for an additional 2 hours. After the ink had mixed, 10 grams of Hyflo Supercel filter aid (available from Fluka Chemical) was added and stirred into the molten ink for 5 minutes. The ink was then filtered through a heated (135° C.) Mott apparatus (available from Mott Mettalurgical) using Whatman #3 filter paper at 5 psi. The filtered ink was poured into molds and allowed to solidify to form ink sticks. This final black ink product was characterized by the following physical properties: viscosity of about 13.8 cPs at 140° C. as measured by a Ferranti-Shirley cone-plate viscometer, and a melting point of about 92° C. as measured by differential scanning calorimetry using a DuPont 2100 calorimeter. The Tg and spectral strength of this ink were not measured. This ink was placed in a Phaser 300 printer which uses a direct printing process. The ink was printed using a print head temperature of 140° C. The finished prints were found to have a coefficient of friction against glass of about 0.28 as measured by a Thwing-Albert Friction/Peel Tester (Model 225-1)

[1] Polywax PE655—Polyethylene wax available from Baker Petrolite Co. of Tulsa, Okla.
[2] Solvent Black 45—Available as Savinyl Black RLSN from Clariant Chemical of Charlotte, N.C.

What is claimed is:

1. A phase change ink, comprising:
   a material of the formula

wherein $X_1$, $X_2$, $X_3$, and $X_4$ are segments which each comprise an atom selected from groups V and VI of the periodic table; the atoms selected from groups V and VI of the periodic table in segments $X_1$, $X_2$, $X_3$, and $X_4$ being the same or different than one another; wherein at least one of $R_1$ and $R_5$ comprises at least 40 carbon units; and wherein $R_2$, $R_3$ and $R_4$ each comprise at least one carbon unit; and
   a colorant.

2. The phase change ink of claim 1 wherein $R_1$, $R_2$, $R_3$, $R_4$ and $R_5$ each consist essentially of carbon and hydrogen.

3. The phase change ink of claim 2 wherein $R_1$ and $R_5$ both comprise at least 40 carbon units, and both are alkyl groups.

4. The phase change ink of claim 1 wherein $X_1$, $X_2$, $X_3$, and $X_4$ are the same as one another and each comprise N, S or O.

5. The phase change ink of claim 1 wherein $X_1$, $X_2$, $X_3$, and $X_4$ are each selected from the group consisting of (NH), S and O.

6. The phase change ink of claim 1 wherein at least one of $R_1$ and $R_5$ comprises from 40 to 100 carbon units.

7. The phase change ink of claim 1 wherein $R_1$ and $R_5$ are the same as one another and each comprise from 40 to 100 carbon units.

8. The phase change ink of claim 1 wherein $X_1$, $X_2$, $X_3$, and $X_4$ each comprise nitrogen.

9. The phase change ink of claim 1 wherein $X_1$, $X_2$, $X_3$, and $X_4$ are each (NH).

10. The phase change ink of claim 1 wherein at least one of $X_1$, $X_2$, $X_3$, and $X_4$ comprises nitrogen.

11. The phase change ink of claim 1 wherein:
   $X_1$ and $X_4$ are the same as one another;
   $X_2$ and $X_3$ are the same as one another; and
   $R_2$ and $R_4$ are the same as one another.

12. The phase change ink of claim 1 further comprising a polyethylene wax dispersed therein to a concentration of greater than 0% and less than or equal to about 90% by weight.

13. The phase change ink of claim 1 further comprising a polyethylene wax dispersed therein to a concentration of from at least about 5% to less than or equal to about 50% by weight.

14. The phase change ink of claim 1 further comprising:
   a viscosity-modifying agent dispersed therein;
   a tackifying agent dispersed therein; and
   a $T_g$ of from about −5° C. to about 40° C.

15. A phase change ink, comprising:
   a material of the formula

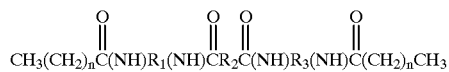

wherein n is an integer greater than or equal to 39 and less than or equal to 99; and wherein $R_1$, $R_2$ and $R_3$ each comprise at least one carbon unit; and
   a colorant.

16. The phase change ink of claim 15 wherein $R_1$ and $R_3$ are alkyl groups.

17. The phase change ink of claim 15 wherein $R_1$, $R_2$ and $R_3$ are alkyl groups.

18. The phase change ink of claim 15 further comprising a polyethylene wax dispersed therein to a concentration of greater than 0% and less than or equal to about 90% by weight.

19. The phase change ink of claim 15 further comprising a polyethylene wax dispersed therein to a concentration of from at least about 5% to less than or equal to about 50%, by weight.

20. A method of reducing a coefficient of friction associated with a phase change ink formulation, comprising:
   providing a material within the ink formulation, the material having the formula

wherein $X_1$, $X_2$, $X_3$, and $X_4$ are segments which each comprise an atom selected from groups V and VI of the periodic table; the atoms selected from groups V and VI of the periodic table in segments $X_1$, $X_2$, $X_3$, and $X_4$ being the same or different than one another; wherein at least one of $R_1$ and $R_5$ comprises at least 40 carbon units; and wherein $R_2$, $R_3$ and $R_4$ each comprise at least one carbon unit; and providing a surface of a printed portion of the ink having a lower coefficient of friction relative to glass than if the material were not provided in the ink formulation.

21. The method of claim 20 wherein $X_1$, $X_2$, $X_3$, and $X_4$ are the same as one another and each comprise N, S or O.

22. The method of claim 20 wherein $X_1$, $X_2$, $X_3$, and $X_4$ each are selected from the group consisting of (NH), S and O.

23. The method of claim 20 wherein $R_1$ and $R_5$ each comprise from 40 to 100 carbon units.

24. The method of claim 20 wherein $R_1$ and $R_5$ are the same as one another and each comprise from 40 to 100 carbon units.

25. The method of claim 20 wherein $X_1$, $X_2$, $X_3$, and $X_4$ are (NH).

26. The method of claim 20 wherein at least one of $X_1$, $X_2$, $X_3$, and $X_4$ comprises nitrogen.

27. The method of claim 20 wherein:

$X_1$ and $X_4$ are the same as one another;

$X_2$ and $X_3$ are the same as one another; and $R_2$ and $R_4$ are the same as one another.

28. The method of claim 20 wherein the material has the formula

wherein n is an integer greater than or equal to 39 and less than or equal to 90.

29. A composition of the formula

wherein $X_1$, $X_2$, $X_3$, and $X_4$ are segments which each comprise an atom selected from groups V and VI of the periodic table; the atoms selected from groups V and VI of the periodic table in segments $X_1$, $X_2$, $X_3$, and $X_4$ being the same or different than one another; wherein $R_1$ and $R_5$ each comprise at least 40 carbon units and consist essentially of carbon and hydrogen, and wherein $R_2$, $R_3$ and $R_4$ each comprise at least one carbon unit and consist essentially of carbon and hydrogen.

30. The composition of claim 29 wherein $R_1$ and $R_5$ are alkyl groups.

31. The composition of claim 29 wherein $X_1$, $X_2$, $X_3$, and $X_4$ are the same as one another and each comprise N, S or O.

32. The composition of claim 29 wherein $X_1$, $X_2$, $X_3$, and $X_4$ are each selected from the group consisting of (NH), S and O.

33. The composition of claim 29 wherein $R_1$ and $R_5$ each comprise from 40 to 100 carbon units.

34. The composition of claim 29 wherein $R_1$ and $R_5$ are the same as one another and each comprise from 40 to 100 carbon units.

35. The composition of claim 29 wherein $X_1$, $X_2$, $X_3$, and $X_4$ each comprise nitrogen.

36. The composition of claim 29 wherein $X_1$, $X_2$, $X_3$, and $X_4$ are each (NH).

37. The composition of claim 29 wherein at least one of $X_1$, $X_2$, $X_3$, and $X_4$ comprises nitrogen.

38. The composition of claim 29 wherein:

$X_1$ and $X_4$ are the same as one another;

$X_2$ and $X_3$ are the same as one another; and $R_2$ and $R_4$ are the same as one another.

39. The composition of claim 29 having the formula

wherein n is an integer greater than or equal to 39 and less than or equal to 99.

* * * * *